H. F. MORSE.
Holdback for Vehicles.
No. 215,150.             Patented May 6, 1879.
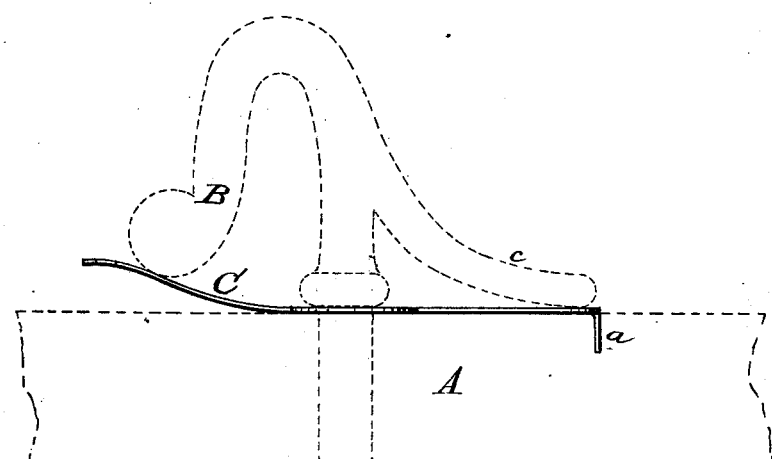
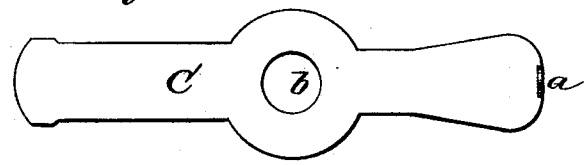
WITNESSES:                    INVENTOR:

UNITED STATES PATENT OFFICE.

HERMON F. MORSE, OF EAST FOXBOROUGH, MASSACHUSETTS.

IMPROVEMENT IN HOLDBACKS FOR VEHICLES.

Specification forming part of Letters Patent No. 215,150, dated May 6, 1879; application filed January 14, 1879.

*To all whom it may concern:*

Be it known that I, HERMON FRANCIS MORSE, of East Foxborough, in the county of Norfolk and State of Massachusetts, have invented a new and useful Improvement in Breeching-Hooks, of which the following is a specification.

This invention relates specifically to the application of a spring to the breeching-hook, to close the same and prevent the breeching from slipping out.

It consists of a flat steel spring, fixed to the shaft by the shank of the breeching-hook, with the free end bearing against the open end of the hook.

In the accompanying drawings, Figure 1 is a side elevation of a shaft and hook with the spring applied thereto, and Fig. 2 is a bottom view or plan of the spring.

Similar letters of reference indicate corresponding parts.

Referring to the drawings, A represents a shaft or thill, and B is the breeching-hook screwed into the same.

C represents the spring, made from a flat piece of finely-tempered steel, having at one end a point or brad, $a$, projecting downward from its under side at right angles, while a short distance from this point the spring is enlarged and provided with a hole, $b$. From the enlarged portion the end opposite the brad is curved upward, as shown in Fig. 1.

The spring is applied to the shaft by placing it on top of the same, with the hole $b$ over the hole or spot where the shank of the hook is entered, and then driving the brad into the shaft and screwing the hook in until its shoulder bears upon the spring and holds it to the shaft; and when the hook has a tail, $c$, this too bears upon the spring near its fixed end. This arrangement holds the spring to the shaft, and the brad prevents it from being slipped sidewise from under the hook.

The curved free end of the spring bears against the end of the hook, and when the breeching is engaged it is prevented from slipping out by the spring.

Having thus described my invention, I claim as new and desire to secure by Letters Patent—

As an improvement in breeching-hooks, the spring C, provided with brad or point $a$ and hole $b$, and held to the shaft by the brad $a$, and by the shank of the hook passed through hole $b$ in the spring, in combination with the hook B, against the free end whereof the upwardly-bent end of the spring is pressed, to close the hook and prevent the breeching from slipping out, substantially as described.

HERMON FRANCIS MORSE.

Witnesses:
JOSEPH A. KINGSBURY,
MARCUS P. FONIST.